(12) United States Patent
Swanson et al.

(10) Patent No.: US 6,624,533 B1
(45) Date of Patent: Sep. 23, 2003

(54) CONTROLLING GENERATOR POWER

(75) Inventors: Allen K. Swanson, Deham, MA (US); Kenneth A. Stevens, Wayland, MA (US)

(73) Assignee: Westerbeke Corporation, Avon, MA (US)

( * ) Notice: Subject to any disclaimer, the term of this patent is extended or adjusted under 35 U.S.C. 154(b) by 0 days.

(21) Appl. No.: 09/368,200

(22) Filed: Aug. 4, 1999

(51) Int. Cl.⁷ .................................................. H02J 7/00
(52) U.S. Cl. ............................ 307/64; 307/46; 307/65; 307/66; 307/67; 307/80
(58) Field of Search .............................. 307/64, 80, 46, 307/65, 66, 67; 322/10, 90; 440/6

(56) References Cited

U.S. PATENT DOCUMENTS

| | | | |
|---|---|---|---|
| 4,099,589 A | | 7/1978 | Williams |
| 4,330,743 A | * | 5/1982 | Glennon ..................... 322/10 |
| 4,335,429 A | | 6/1982 | Kawakatsu |
| 4,521,840 A | | 6/1985 | Hoadley |
| 5,014,660 A | | 5/1991 | Westerbeke |
| 5,337,848 A | | 8/1994 | Bader |
| 5,404,093 A | | 4/1995 | Cowett, Jr. |
| 5,502,628 A | | 3/1996 | Arakawa |
| 5,513,718 A | | 5/1996 | Suzuki et al. |
| 5,543,703 A | | 8/1996 | Kusase et al. |
| 5,563,802 A | * | 10/1996 | Plahn et al. ................ 364/492 |
| 5,574,345 A | | 11/1996 | Yoneta et al. |
| 5,646,458 A | * | 7/1997 | Bowyer et al. ............... 307/67 |
| 5,646,514 A | | 7/1997 | Tsunetsugu |
| 5,659,208 A | | 8/1997 | Kimble et al. |
| 5,663,627 A | | 9/1997 | Ogawa |
| 5,694,307 A | | 12/1997 | Murugan |
| 5,710,696 A | | 1/1998 | Reynolds et al. |
| 5,737,196 A | | 4/1998 | Hughes et al. |
| 6,184,593 B1 | * | 2/2001 | Jungreis ..................... 307/64 |
| 6,487,096 B1 | * | 11/2002 | Gilbreth et al. ............... 363/35 |

FOREIGN PATENT DOCUMENTS

| | | |
|---|---|---|
| EP | 0357183 | 3/1990 |
| JP | 03057792 | 3/1991 |
| JP | 09056197 | 2/1997 |
| JP | 11004506 | 1/1999 |
| JP | 01285756 | 11/1999 |
| WO | WO 98/11643 | 3/1998 |

OTHER PUBLICATIONS

Zeyen, et al. "ISAD®–A Computer Controlled Integrated Starter–Alternator–Damper–System", Future Transportation Conference, Aug. 6–8, 1997 (San Diego, California).
Volt Ampere, Hygen variable speed generating system for quality electric power supply (Commercial Literature, 5 pages); published before Aug. 4, 1998.
Onon Commercial Quiet Diesel 7.5 GenSet (Product Description, 4 pages); 9/96.
Craftsman 3600 Watt/120 Volt Computer Controlled Generator Model No. 580.326903 (Owner's Manual, 2 pages); Apr. 2, 1998.
Balmar, Variable Speed Technology (Product Description, 1 page); 9/92.
International Search Report dated Nov. 6, 2000.

* cited by examiner

*Primary Examiner*—Brian Sircus
*Assistant Examiner*—Robert L. Deberadinis
(74) *Attorney, Agent, or Firm*—Fish & Richardson P.C.

(57) ABSTRACT

A power controller for controlling an engine-driven generator includes a high voltage DC bus interconnecting various power modules. In electrical communication with the DC bus are: a bi-directional DC-DC converter constructed to transfer electrical power from the DC bus to a battery to charge the battery, and from the battery to the DC bus; a rectifier constructed to rectify electrical power from the generator and to supply the rectified power to the DC bus; an inverter constructed to convert DC bus electrical power to AC electrical power and to supply the AC power to an output connector; and an AC-DC constructed to convert AC electrical power, supplied via an input connector, to DC bus electrical power. The controller may be employed in a power supply on a mobile vehicle or boat, for example. The power modules of the controller cooperate in various combinations to provide a wide variety of power transfer functions.

29 Claims, 4 Drawing Sheets

CONTROLLING GENERATOR POWER

BACKGROUND OF THE INVENTION

The invention relates to controlling the electrical power generated by engine-driven generators and the like, such as in stand-alone engine-generator sets.

Modern electrical generators, such as for supplying electrical power on board vehicles or boats, or for supplying standby power in the event of a grid power failure, employ various types of power controllers to regulate and condition the output power of the generator. Early generators were generally of the synchronous type, designed to be run at a constant speed to provide a desired frequency output. More recently, generator systems have been developed which can be run over a limited range of speeds and still provide a constant frequency output.

Frequently, generators are mounted in mobile vehicles or boats to provide on board electrical power. In marine applications, and in many land vehicle applications, such generators are coupled to a dedicated engine for rotating the generator to provide electrical power. These engine-generator sets may be speed-modulated to run at a constant speed and therefore employ synchronous power control technology, or may be speed-modulated to vary the engine speed as a function of generator load to optimize engine efficiencies, which can enable a reduction in component size and weight. Variable speed generators may also be desirable for noise-sensitive applications in which the generator will be operated frequently at low power levels. Fuel-powered engine-generator sets provide a reliable supply of AC electrical power at a desired voltage and frequency, which may be particularly useful when travelling between global regions having different AC power standards (e.g., 120 VAC at 60 Hertz in the United States and 230 VAC at 50 Hertz in many parts of Europe). Although shore power may be provided at dock berths and camp sites, for instance, such power may not be at a voltage or frequency compatible with on board electrical appliances and systems.

Self-contained engine-generator sets are sometimes provided as a complete package with mountable frame. Such self-contained systems may be supplied with a battery, such as a 12 volt DC automotive or marine battery, for providing power to start the engine. Some of the engines of these sets have separate charging systems for maintaining battery voltage.

Engine-generator sets for marine applications are frequently designed to be cooled by circulating sea water through either the engine or a liquid-to-liquid heat exchanger. By "sea water", we mean water from the body of water in which the boat is afloat, which may be fresh or salt water, ocean or lake water.

SUMMARY OF THE INVENTION

According to one aspect of the invention, a power controller for controlling an engine-driven generator includes a conductor defining a DC bus for conducting electrical DC power at a DC bus voltage of at least 120 volts. The controller also includes, in electrical communication with the DC bus: a bi-directional DC-DC converter in electrical communication with a battery and constructed to transfer electrical power from the DC bus to the battery to charge the battery, and from the battery to the DC bus; a rectifier in electrical communication with the generator and constructed to rectify electrical power from the generator and to supply the rectified power to the DC bus; and an inverter constructed to convert DC bus electrical power to AC electrical power and to supply the AC power to an output connector.

In some embodiments, the power controller is constructed to supply electrical power to windings of the generator, from the battery via the DC-DC converter and the DC bus, of a polarity selected to generate torque for starting the engine.

In some preferred cases, the DC-DC converter is further adapted to transfer electrical power from the battery to the DC bus to supplement DC bus voltage during high loads.

Some embodiments also include an AC-DC converter in electrical communication with both the DC bus and an input connector, the AC-DC converter constructed to convert AC electrical power, supplied via the input connector, to DC bus electrical power. Preferably, the AC-DC converter is adapted to accept AC electrical power of one frequency, the inverter being constructed to supply AC electrical power of another frequency. The power controller may also be constructed to supply electrical power to windings of the generator, from the input connector via the AC-DC converter and the DC bus, of a polarity selected to generate torque for starting the engine.

Preferably, the power controller is adapted to maintain the DC bus voltage above at least 120 volts from a minimum generator speed to a maximum generator speed of at least 3 times the minimum generator speed.

For many applications, it is preferable that the power controller be adapted to supply at least about 2 kilowatts (in some cases, at least 5 kilowatts) of electrical power via the output connector.

In some cases, the bi-directional DC-DC converter, the rectifier, and the inverter are enclosed within a common controller housing.

Preferably, the power controller is adapted to supply at least about 1 kilowatt (more preferably, at least about 2 or even more than about 5 kilowatts, in some cases) of AC electrical power, from the battery via the DC-DC converter, the DC bus, the inverter and the output connector, with the generator off.

For some applications, the output connector has first, second and third conductors, the first and second conductors having a difference in electrical potential of about 240 volts AC, and the first and third conductors having a difference in electrical potential of about 120 volts AC.

Some embodiments include a DC bus voltage sensor connected to the DC bus and adapted to control engine speed as a function of DC bus voltage.

The power controller, in some instances, also includes a DC bus voltage sensor responsive to DC bus voltage. The controller is adapted to automatically start the engine-driven generator in response to a signal from the DC bus voltage sensor indicating a drop in DC bus voltage to a value below a predetermined minimum voltage.

According to another aspect of the invention, a power supply, for supplying electrical power on board a vehicle, is provided. The power supply includes an engine, a generator mechanically coupled to the engine for rotation to generate electrical power, and the above-described power controller electrically coupled to the generator for controlling the power generated by the generator.

According to another aspect of the invention, a marine power supply for supplying electrical power on board a boat, includes an engine adapted to be cooled by seawater, a generator mechanically coupled to the engine for rotation to generate electrical power, and the above-described power controller electrically coupled to the generator for controlling the power generated by the generator.

In some embodiments, the power controller includes an AC-DC converter in electrical communication with both the DC bus and a shore power connector, the AC-DC converter constructed to convert AC electrical power, supplied via the shore power connector, to DC bus electrical power.

Preferably, the power controller includes a controller housing, with the bi-directional DC-DC converter, the rectifier, and the inverter all enclosed within the controller housing.

The invention can advantageously perform several power transfer, manipulation and conditioning functions, the various components of the controller operating cooperatively through the high voltage DC bus in various combinations to provide useful AC power of a desired frequency and voltage—either from the generator or, if the generator is turned off, from a storage battery or shore power connection. In various configurations, the controller can also provide for unattended starting and stopping of the engine when necessary to charge batteries or maintain a necessary voltage. As a combination of inter-connected power manipulation "modules", the controller of the invention offers an advantageous level of flexibility and synergy—particularly for providing controlled power on a mobile vehicle, such as an emergency or recreational vehicle or boat. Other advantages and aspects of the invention will be understood from the following description of embodiments, and from the claims.

EMBODIMENTS

Figure 1:
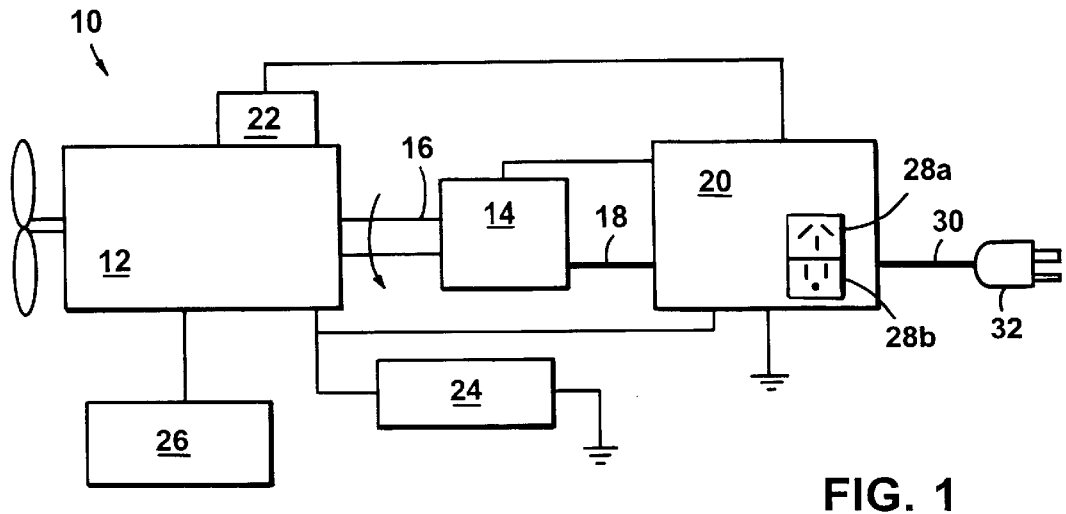
FIG. 1 functionally illustrates an engine-driven electrical power supply with a generator power controller.

Referring to FIG. 1, electrical power supply 10 includes a gas-powered combustion engine 12 which drives a three-phase electrical generator 14 via an output shaft 16. Diesel-powered engines may also be employed, and the engine and generator may be of any types known in the art. The output power of the generator (represented by heavy line segment 18) is conditioned and converted into power of desired characteristics (e.g., phase, voltage, frequency) by a power controller 20, discussed in more detail below. In the embodiment of FIG. 1, controller 20 also provides control signals to the controls 22 of engine 12, for regulating the speed of shaft 16 under varying electrical load conditions and for killing the engine when shaft power is no longer desired or in the event of a detected failure or safety hazard. A standard 12 or 24 VDC (direct current voltage) battery 24 is charged from controller 20 and stores electrical power for later use. Fuel is provided to engine 12 from fuel tank 26.

Receptacles 28a and 28b on controller 20 are configured to accept standard 3-prong electrical plugs (not shown) for transferring AC power to useful electrical devices (loads) as desired. In the figures, receptacle 28a is illustrated as configured for a standard 240 VAC (alternating current voltage) plug and receptacle 28b is illustrated as configured for a standard 120 VAC (i.e., typical household) plug. It will be understood that any arrangement of receptacle types may be provided, either mounted directly on controller 20 or connected thereto with appropriate wiring.

An input power cord 30 between controller 20 and a shore power connector 32 enables the engine-generator system to be "plugged into" a standard receptacle, for receiving AC shore power of a given frequency and voltage. As discussed in more detail below, controller 20 converts this shore power to useful output power of different characteristics, provided through receptacles 28a and 28b. As needed, controller 20 also converts shore power for charging battery 24 or for motoring generator 14 to start engine 12. With generators mounted on mobile vehicles or boats, this flexibility is particularly advantageous, enabling users to readily accept power of practically any standard frequency/voltage characteristics while docked or parked, for powering on-board electrical systems and appliances and for charging on-board batteries.

Figure 2:
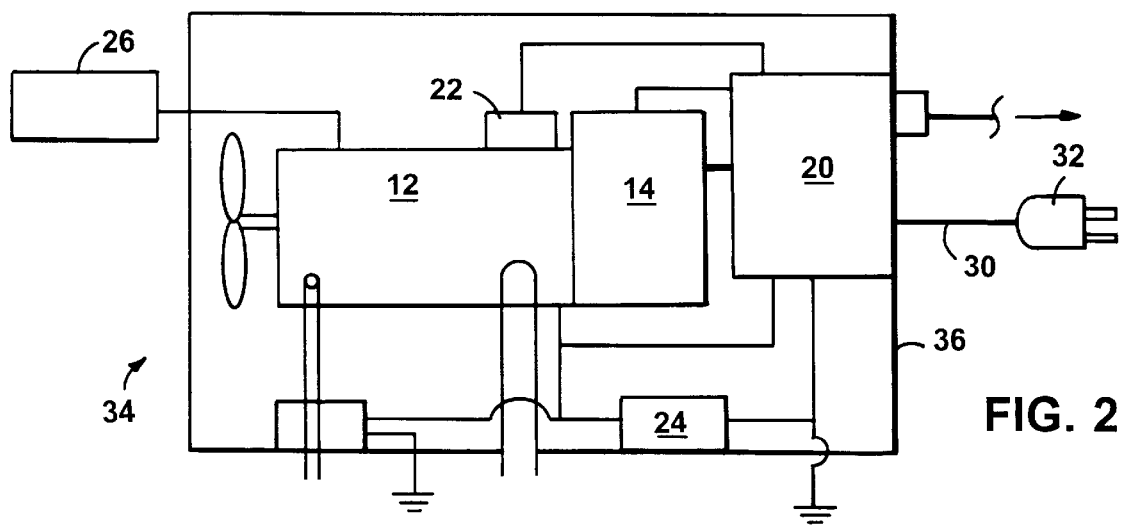
FIG. 2 schematically illustrates the power supply of FIG. 1, packaged for a mobile power application.
Figure 3:
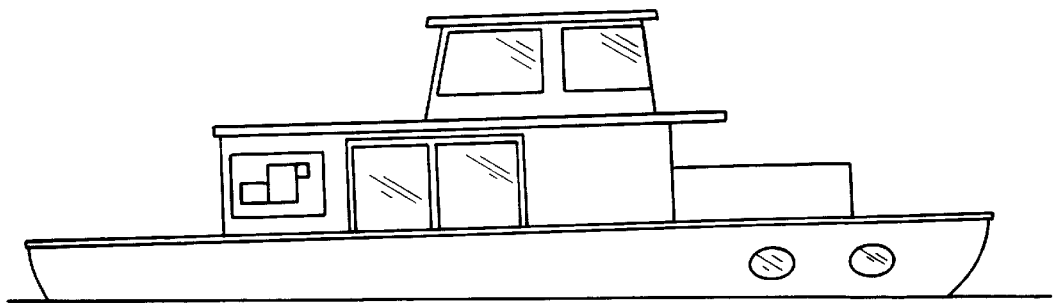
FIGS. 3 and 4 show the power supply mounted in a boat and a recreational vehicle, respectively, for supplying on-board electrical power.
Figure 4:
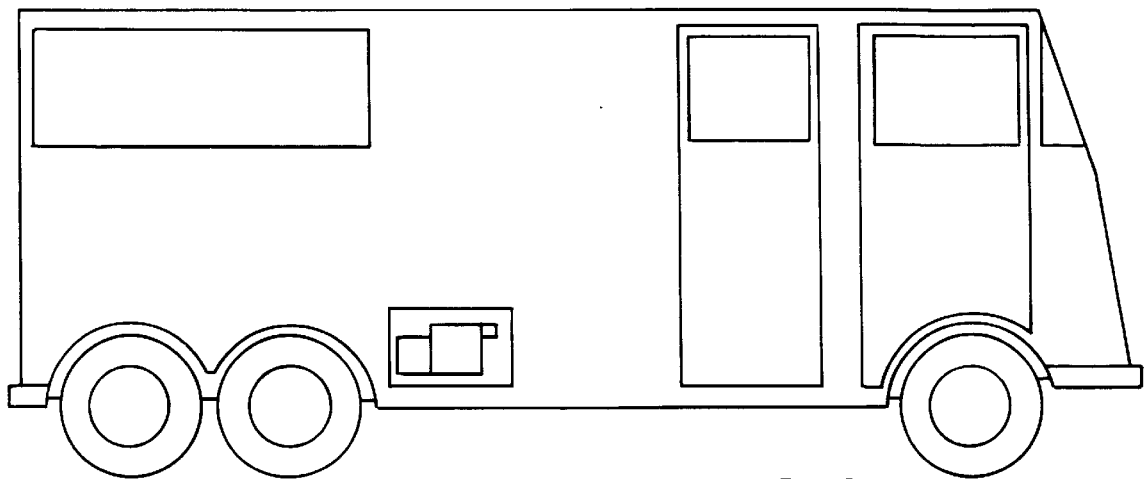

FIG. 2 illustrates a stand-alone engine-generator set 34 for use on a boat or mobile vehicle (as shown, for instance, in FIGS. 3 and 4). Except for fuel tank 26, all elements of the electrical power supply 10 of FIG. 1 are contained within a sound-dampening enclosure 36, the interior of which is accessible for maintenance. For marine applications, a presently preferred construction of enclosure 36 is disclosed in U.S. patent application Ser. No. 08/946,037, filed Oct. 7, 1997 and incorporated herein by reference. When permanently mounted on a mobile vehicle or boat, the output power receptacles will generally be mounted remotely, in convenient locations throughout the vehicle or boat. In such cases, the output power is preferably routed from controller 20 through the enclosure and to a remote breaker box by a cable enclosed in protective conduit (not shown). Similarly, shore power connector 32 may be remotely mounted (on a reel, for instance) and connected to controller 20 via appropriately secured wiring. For mounting on a boat less than about 30 feet above the waterline, an electric suction pump 38 can be employed to circulate fresh or salt water through engine 12 for cooling. For water-cooling a normally air-cooled engine, the engine may be equipped with a cooling jacket as taught in U.S. patent application Ser. No. 08/897,128, filed Jul. 18, 1997 and incorporated herein by reference. For other applications, engine-generator set 36 may be equipped with a cooling system as disclosed in U.S. Pat. No. 5,014,660, also incorporated by reference.

As shown in FIGS. 3 and 4, engine-generator set 36 is readily mounted on boat or land vehicle, for providing on-board power. Useful applications include mounting on emergency vehicles, such as ambulances or fire engines. Many mounting configurations for such generator sets are known in the art. In these applications, the engine-generator set does not provide the primary motive power for the boat or vehicle, but provides power primarily for auxiliary functions, generally rated for between about 2 and 30 kilowatts.

Figure 5:
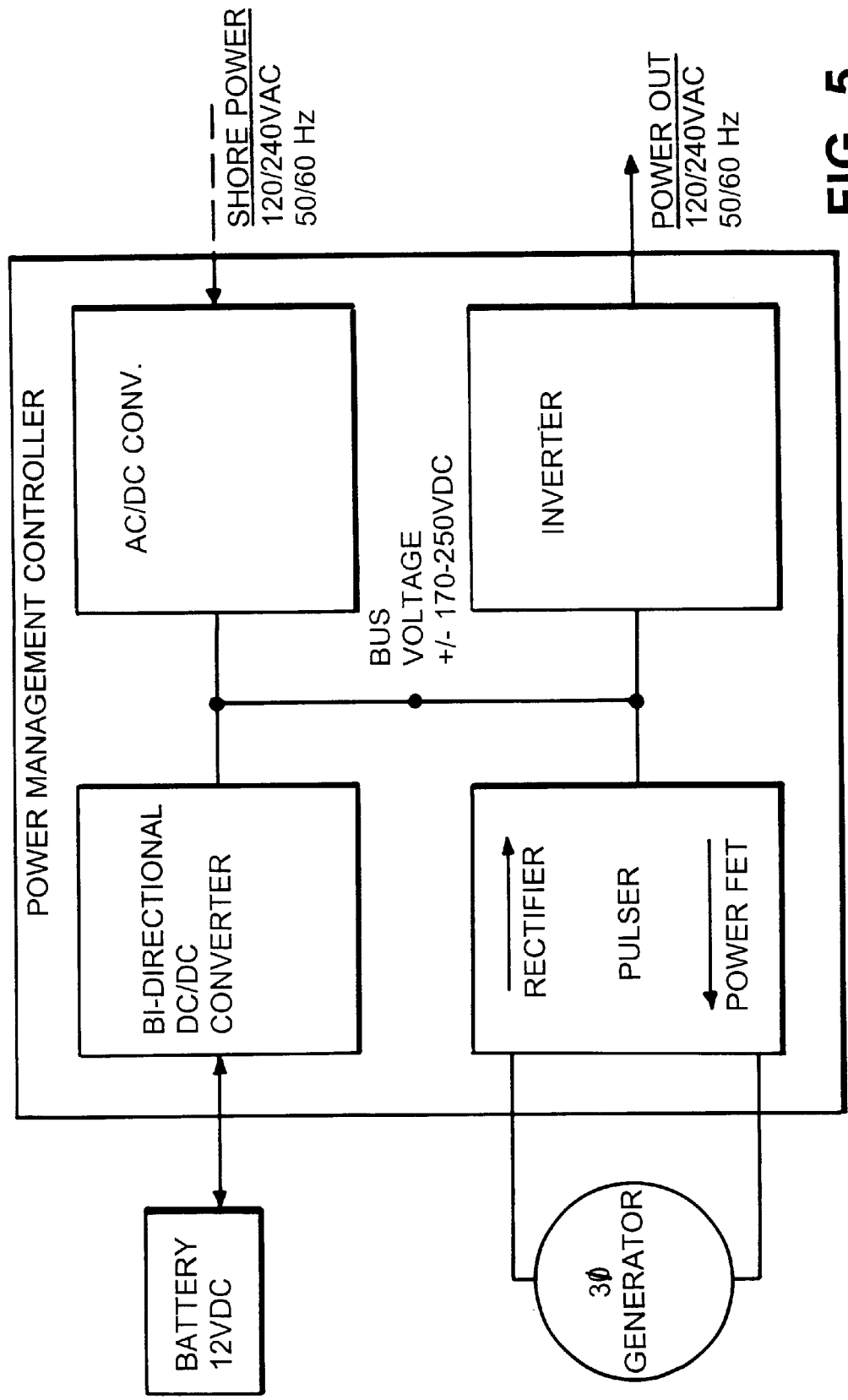
FIG. 5 is an upper level schematic illustrating the major functional systems of the power controller.

Referring to FIG. 5, controller 20 contains four interconnected electronic power circuits: a bi-directional DC/DC voltage converter 40, an AC/DC converter 42, a generator interface module 44, and a DC/AC inverter 46, all interconnected by a common, high-voltage bus 48 maintained at 170 to 250 VDC. The requisite control/signal circuitry of controller 20 is not functionally shown in FIG. 5. AC/DC converter 42 functions to transfer power from the shore power connector to bus 42, conditioning and converting the power as necessary. Converter 42 is preferably configured to accept input power at both 120 and 240 VAC and at both 50 and 60 Hertz frequencies. Inverter 46 transfers electrical power from DC bus 46 to an electrical output, converting the power from direct to alternating current. Preferably, inverter 46 is switchable between output power frequencies of 50 and 60 Hertz, and provides both 120 and 240 VAC potentials. For many applications, both inverter 46 and AC/DC converter 42 are rated for transferring up to at least 8 kilowatts of power. How to configure detailed circuitry to perform these power transfer functions is within the knowledge of one skilled in the art of power conversion and conditioning.

DC/DC converter 40 performs two primary functions. Operating in one direction, it transfers electrical power from 12 VDC battery 24 to high-voltage DC bus 48, stepping up the voltage accordingly, to maintain bus 48 at a desired voltage level. This is useful either when the engine is not running, or for quickly supplementing bus voltage during abrupt changes in load that would otherwise cause undesirable dips in bus voltage while the engine (which has a slower response time) throttles up in response. In the other direction, as needed, it transfers power back to the battery from bus 48, stepping down the voltage, to re-charge battery 24. For many applications, converter 40 is preferably adapted to transfer a maximum of at least about two kilowatts in either direction.

Generator interface 44 also performs two primary functions. In one direction, it transfers electrical power from generator 14 to bus 48, from which it is put to useful effect by either DC/DC converter 40 or inverter 46. In the other direction, interface 44 transfers power from bus 48 to windings of generator 14 to motor the generator to provide shaft power for starting the attached engine.

Controller 20 operates to maintain the voltage of the high-voltage DC bus 48 during changes in electrical loads. In one sense, the voltage is maintained by proper power modulation in the generator interface 44. However, other control schema are also employed. For example, in some embodiments bus voltage is provided as an input to the engine controls 22 of FIG. 1, such that the speed of the engine is controlled partly as a function of the voltage of bus 48. Also, because the response time of DC/DC converter 40 is much quicker than that of the engine, converter 40 is also controlled to augment bus voltage with power from battery 24 during abrupt increases in loads, such as when a large inductive motor is turned on.

Providing a common, filtered, high-voltage DC bus 48 also provides the advantage of isolating the frequency of the output power supplied via inverter 46 from the fluctuations in frequency of the power received from generator 14 due to changes in engine speed. Controller 20 may be readily constructed to operate over a 3:1 engine speed range while supplying a stable output.

Figure 6:
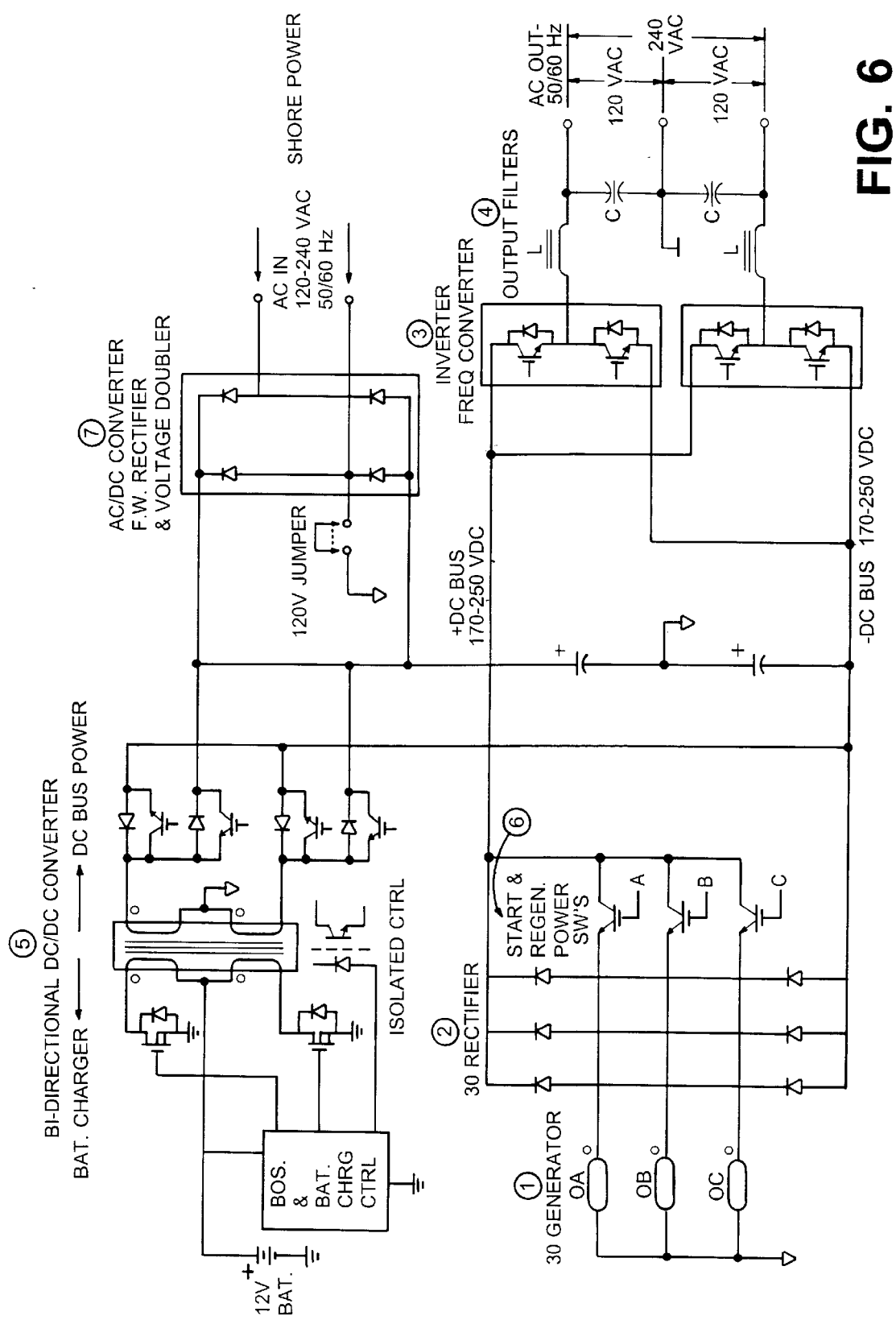
FIG. 6 is a functional schematic of the controller.

Representational power circuits for all four functional power modules of the controller are shown in FIG. 6. The primary power conversion function of AC/DC converter 42 is performed by a voltage doubler/rectifier 50 feeding the positive leg of the high-voltage DC bus 48. A jumper 52 allows for switching between 120 VAC and 240 VAC inputs. Because AC shore power is first rectified into DC bus power before being put to useful work, power of any standard input frequency (e.g., 50 or 60 Hertz) is automatically accommodated. Inverter 46 contains two sets 54a and 54b of pulse width-modulated power transistors (e.g., MOSFETs or IGBTs) that are switched at 20 KHz to produce pulsed AC sine waves that are then passed through filters 56 to remove their high frequency content. The IGBT sets 54a and 54b are controlled to produce two in-phase sine waves for high current, 120 VAC output, and to produce two out-of-phase sine waves for 240 VAC output.

Controller interface 44 is shown configured for use with a three-phase generator 14. For transferring power from controller 14 to bus 48, interface 44 contains a three-phase rectifier 58 consisting of three opposed pairs of diodes, each pair connecting a respective one of the three parallel windings 60a, 60b and 60c of the generator to the high and low sides of bus 48. For motoring the generator, interface 44 contains a three-phase motor drive 62 fed from the positive (and/or negative) leg of the high voltage bus.

For supplying battery voltage to the high voltage bus 48, DC/DC converter 40 contains appropriate switches 64 for pulsing voltage from battery 24 through a primary winding of transformer 66 and power circuitry 68 for rectifying the transformed pulse into high voltage DC power for bus 48. Similarly, high voltage DC power is pulsed through the secondary winding of transformer 66 to step the voltage down, and then rectified back to DC to charge battery 24. The flow of power through DC/DC converter 40 is controlled by an isolated converter controller 70, which automatically controls the power switches in converter 40 as a function of battery voltage and the voltage of bus 48. Optionally, converter controller 70 may receive other inputs related to detectable states (e.g., whether battery 24 is present, etc.) and/or user inputs.

The overall control functions of power controller 20 are readily performed with available microprocessors or with a single digital signal processor (DSP), not shown. Input signals to such a DSP may include engine speed, battery voltage, bus voltage, output current, internal heat sink temperatures, battery cable current and sense, and user switch states. Output signals from the microprocessor drive the various transistors shown in FIG. 6, and may also include signals for controlling engine fuel and air delivery, engine ignition, and performance signals for driving status indicators. Besides accepting input from a user-manipulated "on/off" switch, the microprocessor is readily programmed to operate in a selectable "automatic" mode, automatically starting the engine, for example, if bus voltage gets below a predetermined threshold.

The incorporation of the function of all four of the power modules shown in FIG. 5 into one integrated controller 20 enables the beneficial cooperation of various sets of those modules to perform certain tasks. For instance, controller 20 can start engine 12 (FIG. 1) using either shore power (if available; via AC/DC converter 42 and generator interface 44) or using battery power (via DC/DC converter 40 and generator interface 44). The selection of the source of the starting power is made automatically. Also, battery 24 can be charged either from generator 14 (via generator interface 44 and DC/DC converter 40) or shore power (via AC/DC converter 42 and DC/DC converter 40). Output power can be supplied to inverter 46 from any of the other three modules, as needed. If connected to shore power, for instance, AC/DC converter 42 can cooperate with inverter 46 to function as a frequency converter while the engine remains idle.

Other embodiments are within the scope of the following claims.

What is claimed is:

1. A power controller for controlling an engine-driven generator, the controller comprising:
   a conductor defining a DC bus for conducting electrical DC power at a DC bus voltage of at least 120 volts;
   a bi-directional DC-DC converter in electrical communication with the DC bus and a battery and constructed to transfer electrical power from the DC bus to the battery to charge the battery, and from the battery to the DC bus;

a rectifier in electrical communication with the DC bus and the generator and constructed to rectify electrical power from the generator and to supply the rectified power to the DC bus;

an inverter in electrical communication with the DC bus and constructed to convert DC bus electrical power to AC electrical power and to supply the AC power to an output connector; and an AC-DC converter in electrical communication with both the DC bus and an input connector, the AC-DC converter constructed to convert AC electrical power, supplied via the input connector, to electrical power for the DC bus, wherein the controller is capable of motoring the engine-driven generator using either the electrical power from the AC-DC converter or the electrical power from the battery.

2. The power controller of claim 1 constructed to supply electrical power to windings of the generator, from the battery via the DC-DC converter and the DC bus, of a polarity selected to generate torque for starting the engine.

3. The power controller of claim 1 wherein the DC-DC converter is further adapted to transfer electrical power from the battery to the DC bus to supplement DC bus voltage during high loads.

4. The power controller of claim 1 further comprising a DC bus voltage sensor responsive to DC bus voltage; the controller adapted to automatically start the engine-driven generator in response to a signal from the DC bus voltage sensor indicating a drop in DC bus voltage to a value below a predetermined minimum voltage.

5. The power controller of claim 1, wherein the AC-DC converter is adapted to accept AC electrical power of one frequency, and wherein the inverter is constructed to supply AC electrical power of another frequency.

6. The power controller of claim 1, constructed to supply electrical power to windings of the generator, from the input connector via the AC-DC converter and the DC bus, of a polarity selected to generate torque for starting an engine motored by the generator.

7. The power controller of claim 1 adapted to maintain the DC bus voltage above at least 120 volts from a minimum generator speed to a maximum generator speed of at least 3 times the minimum generator speed.

8. The power controller of claim 1 adapted to supply at least about 1 kilowatt of electrical power via the output connector.

9. The power controller of claim 8 adapted to supply at least about 2 kilowatts of electrical power via the output connector.

10. The power controller of claim 9 adapted to supply at least about 5 kilowatts of electrical power via the output connector.

11. The power controller of claim 1 wherein the bi-directional DC-DC converter, the rectifier, and the inverter are enclosed within a common controller housing.

12. The power controller of claim 1 adapted to supply at least about 1 kilowatt of AC electrical power, from the battery via the DC-DC converter, the DC bus, the inverter and the output connector, with the generator off.

13. The power controller of claim 12 adapted to supply at least about 2 kilowatts of AC electrical power, from the battery via the DC-DC converter, the DC bus, the inverter and the output connector, with the generator off.

14. The power controller of claim 13 adapted to supply at least about 5 kilowatts of AC electrical power, from the battery via the DC-DC converter, the DC bus, the inverter and the output connector, with the generator off.

15. The power controller of claim 1 wherein the output connector has first, second and third conductors, the first and second conductors having a difference in electrical potential of about 240 volts AC, and the first and third conductors having a difference in electrical potential of about 120 volts AC.

16. The power controller of claim 1 further comprising a DC bus voltage sensor connected to the DC bus and adapted to control engine speed as a function of DC bus voltage.

17. A power supply for supplying electrical power on board a vehicle, the power supply comprising an engine;

a generator mechanically coupled to the engine for rotation to generate electrical power; and the power controller of claim 1 electrically coupled to the generator for controlling the power generated by the generator.

18. A marine power supply for supplying electrical power on board a boat, the power supply comprising an engine adapted to be cooled by seawater;

a generator mechanically coupled to the engine for rotation to generate electrical power; and the power controller of claim 1 electrically coupled to the generator for controlling the power generated by the generator.

19. The marine power supply of claim 18 wherein the power controller includes a controller housing, the bi-directional DC-DC converter, the rectifier, and the inverter being enclosed within the controller housing.

20. A power controller for controlling an engine-driven generator, the controller comprising:

a conductor defining a DC bus for conducting electrical DC power at a DC bus voltage of at least 120 volts;

an AC-DC converter in electrical communication with both the DC bus and an input connector, the AC-DC converter constructed to convert AC electrical power, supplied via the input connector, to DC bus electrical power;

a rectifier in electrical communication with the DC bus and the generator and constructed to rectify AC electrical power from the generator and to supply the rectified power to the DC bus; and an inverter in electrical communication with the DC bus and constructed to convert DC bus electrical power to AC electrical power and to supply the AC power to an output connector;

wherein the controller is capable of motoring the engine-driven generator using the electrical power from the AC-DC converter.

21. The power controller of claim 20 wherein the AC-DC converter is adapted to accept AC electrical power of one frequency, and wherein the inverter is constructed to supply AC electrical power of another frequency.

22. The power controller of claim 20 constructed to supply electrical power to windings of the generator, from the input connector via the AC-DC converter and the DC bus, of a polarity selected to generate torque for starting the engine.

23. The power controller of claim 20 adapted to maintain the DC bus voltage above at least 120 volts from a minimum generator speed to a maximum generator speed of at least 3 times the minimum generator speed.

24. The power controller of claim 20 adapted to supply at least about 1 kilowatt of electrical power via the output connector.

25. The power controller of claim 24 adapted to supply at least about 2 kilowatts of electrical power via the output connector.

26. The power controller of claim 25 adapted to supply at least about 5 kilowatts of electrical power via the output connector.

27. The power controller of claim 20 wherein the AC-DC converter, the rectifier, and the inverter are enclosed within a common controller housing.

28. The power controller of claim 20 further comprising a DC bus voltage sensor connected to the DC bus and adapted to control engine speed as a function of DC bus voltage.

29. The power controller of claim 20 further comprising a DC bus voltage sensor responsive to DC bus voltage; the controller adapted to automatically start the engine-driven generator in response to a signal from the DC bus voltage sensor indicating a drop in DC bus voltage to a value below a predetermined minimum voltage.

* * * * *